United States Patent [19]

Medernach

[11] 4,410,240
[45] Oct. 18, 1983

[54] MOUNTING STRUCTURE FOR ELECTRO-OPTIC CHARACTER ELEMENTS

[75] Inventor: John W. Medernach, Albuquerque, N. Mex.

[73] Assignee: Motorola, Inc., Schaumburg, Ill.

[21] Appl. No.: 282,479

[22] Filed: Jul. 13, 1981

[51] Int. Cl.³ ............................................. G02F 1/03
[52] U.S. Cl. ................................... 350/356; 350/354; 350/392
[58] Field of Search ....................... 350/356, 354, 392; 174/52 FP; 357/74

[56] References Cited

U.S. PATENT DOCUMENTS

| | | |
|---|---|---|
| 3,725,910 | 4/1973 | McNaney ............................ 350/356 |
| 3,945,715 | 3/1976 | Drake . |
| 3,967,253 | 6/1976 | Tsuruishi . |
| 4,158,201 | 6/1979 | Smith et al. . |
| 4,170,722 | 10/1979 | Bly . |

Primary Examiner—James W. Davie
Assistant Examiner—Leon Scott, Jr.
Attorney, Agent, or Firm—Mark P. Kahler; Edward M. Roney; James W. Gillman

[57] ABSTRACT

A mounting structure is provided for electro-optical display character elements. The mounting structure includes first and second electrically insulative substrates, each substrate of which includes an aperture. The aperture of the second substrate is somewhat smaller than the aperture of the first substrate such that when the apertures are aligned, the second substrate exhibits a lip under the aperture of the first structure. A display character element including electrodes on the opposed surfaces thereof is situated in the aperture of the first substrate. Electrode elements on the lower surface of the display character element are electrically coupled to corresponding electrode elements situated on the upper surface of the second substrate extending onto the lip. An interconnecting element electrically couples electrodes on the upper surface of the character element to corresponding electrodes on the upper surface of the first substrate.

3 Claims, 4 Drawing Figures

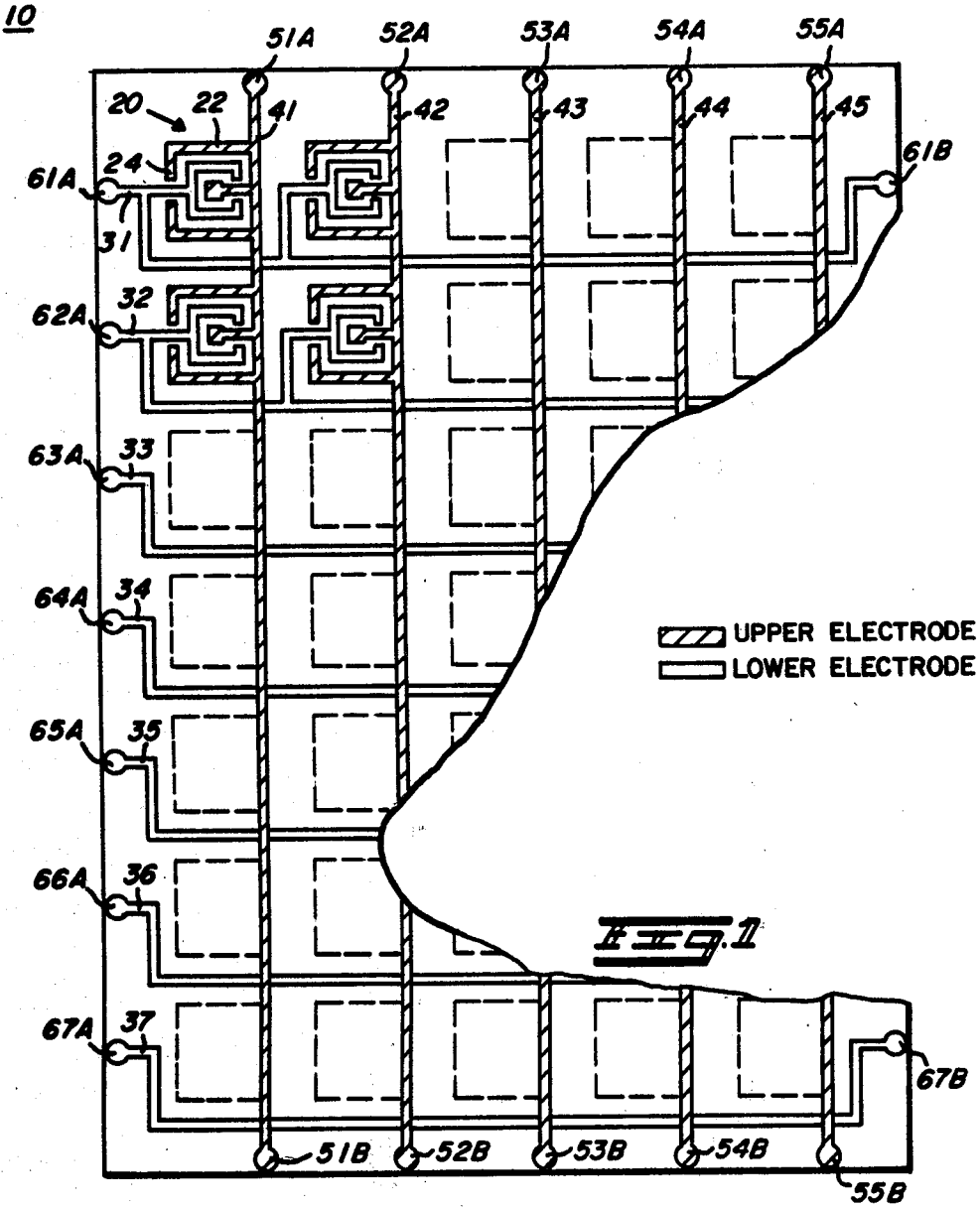
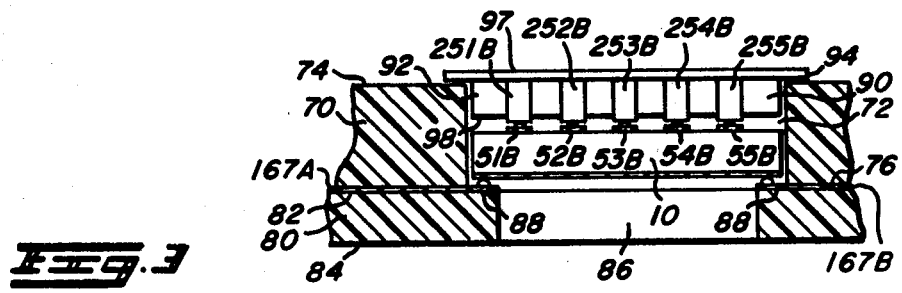

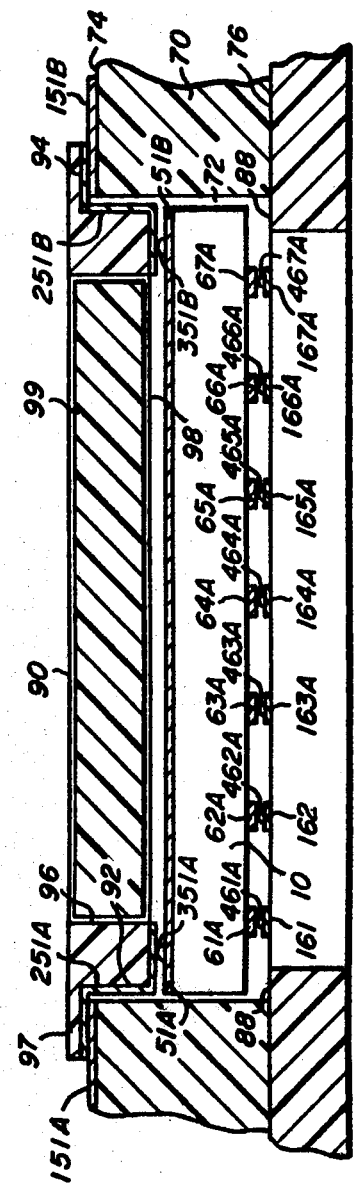

MOUNTING STRUCTURE FOR ELECTRO-OPTIC CHARACTER ELEMENTS

BACKGROUND OF THE INVENTION

This invention relates generally to mounting structures for electro-optic displays, and more particularly, to mounting structures capable of accomodating a plurality of individual character display elements.

DESCRIPTION OF THE PRIOR ARTS

In the past, several character elements have been fabricated on a single wafer of PLZT (lanthanum doped lead zirconate titanate-a ferroelectric optical display material). However, relatively large portions of the PLZT wafer typically remain unoccupied by character elements in such single wafer displays. To prevent waste of valuable PLZT, individual character elements are fabricated on respective PLZT substrates which are substantially the same size as the character to be displayed. One such individual character element is shown in FIG. 1 as display 10. Display 10 is a wafer of PLZT material having a plurality of electrodes situated on the upper and lower surfaces thereof in a matrix format appropriately configured to form designated characters when appropriate electrical potentials are applied to selected cells thereof. Each cell (for example, cell 20) is comprised of a lower electrode and an upper electrode (respectively electrodes 22 and 24 in example cell 20). The lower surface electrodes and the upper surface electrodes are respectively connected to row and column connecting buses (for example, buses 31 and 41) as shown in FIG. 1 to permit each cell to be individually addressed and activated for display. Each of row buses 31-37 include connecting pads (for example, 61A and 61B) situated at the opposite ends thereof to facilitate connection of such row buses to external electrical circuitry. In a like manner, each of column buses 41-45 include connecting pads (for example, pads 51A and 51B) situated at the opposed ends thereof to facilitate connection of such column buses to external electrical circuitry.

Although display 10 results in the elimination of the waste of valuable PLZT material between character elements, display 10 presents mounting problems which must be overcome.

One object of the present invention is to provide reliable electrical connections between discrete PLZT character elements and external electrical circuitry without damaging the fragile PLZT wafer.

Another object of the invention is to mount a plurality of discrete PLZT character elements in a single mounting structure.

These and other objects of the invention will become apparent to those skilled in the art upon consideration of the following description of the invention.

BRIEF SUMMARY OF THE INVENTION

The present invention is directed to providing a mounting structure for discrete PLZT character elements.

In accordance with one embodiment of the invention, an optical display mounting structure includes an electrically insulative substrate having at least one cavity situated therein. Each cavity is shaped to receive a display character element therein. The mounting structure includes at least one display character element having electrodes situated on the opposed surfaces thereof. One display character element is situated in each cavity. The mounting structure further includes a mounting panel having at least one opening. Each opening of the mounting panel is substantially aligned with a respective cavity of the substrate and forms a lip therewith. First electrode elements are situated on the surface of the substrate opposite the mounting panel. The display mounting structure includes interconnection apparatus for electrically coupling the electrodes on the character element surface adjacent the first electrode elements to the first electrode elements. Second electrode elements are situated on the surface of the mounting panel adjacent the character display element. The second electrode elements extend onto the lip so as to contact and electrically couple to the electrodes on the adjacent surface of the character element.

The features of the invention believed to be novel are set forth with particularity in the appended claims. The invention itself, however, both as to organization and method of operation, together with further objects and advantages thereof, may best be understood by reference to the following description taken in conjunction with the accompanying drawings.

DESCRIPTION OF THE DRAWINGS

FIG. 1 is a representation of a portion of an electro-optic display character element.

FIG. 3 is a sectional view of the mounting structure along the line 3—3 of FIG. 2.

FIG. 4 is a sectional view of the mounting structure along the line 4—4 of FIG. 2.

DETAILED DESCRIPTION OF THE PREFERRED EMBODIMENT

Figure 2:
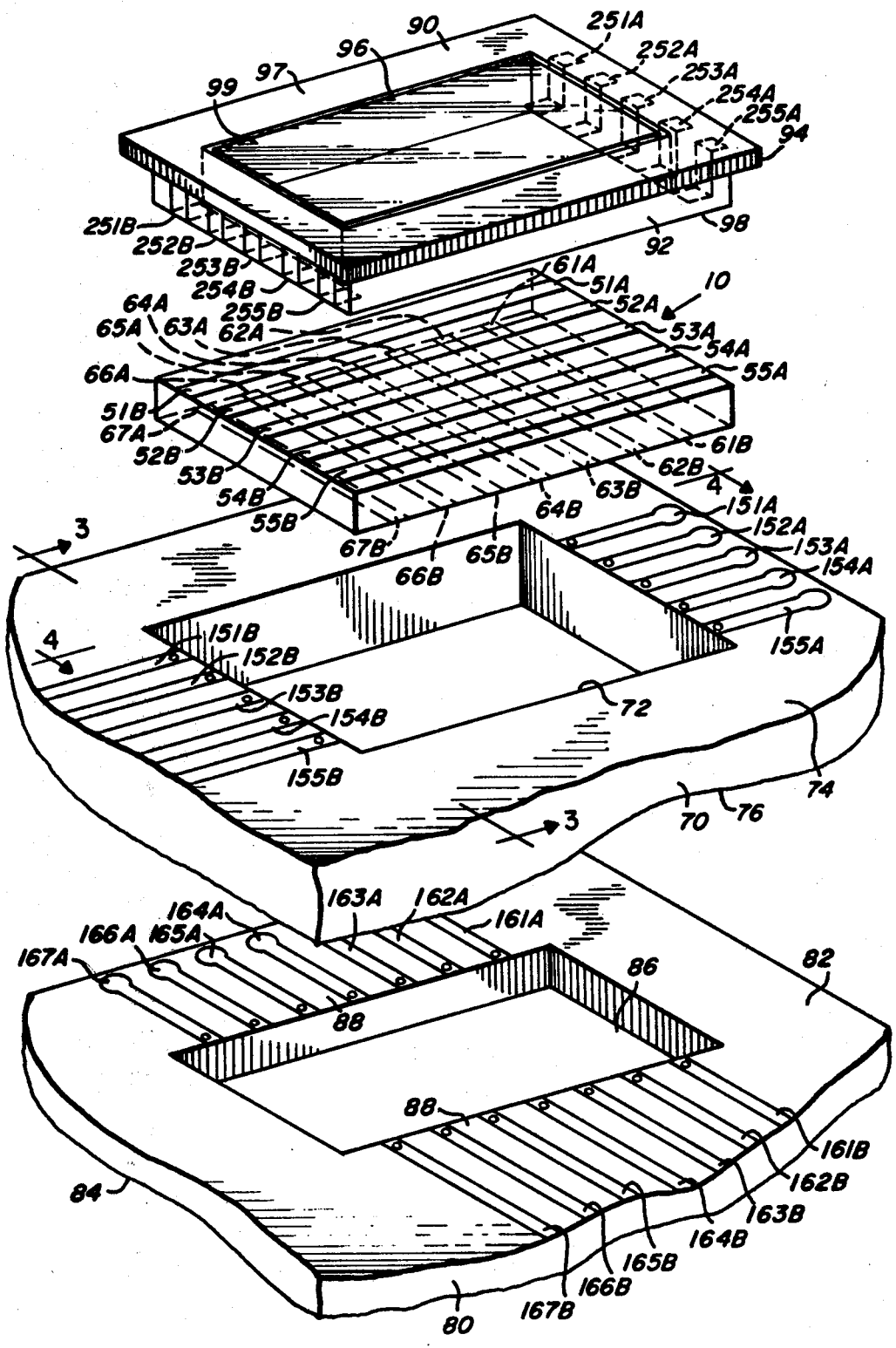
FIG. 2 is an exploded view of the mounting structure of the present invention.

FIG. 2 illustrates an exploded view of the mounting structure of the present invention including a discrete electro-optic character element 10 mounted therein. The mounting structure includes a substrate of electrically insulative material 70. A plurality of cavities 72 are provided in substrate 70. One such cavity 72 is provided for each display character 10 for which mounting is desired. Cavity 72 is appropriately shaped and dimensioned to accomodate character display element 10 therein as shown in FIG. 2 and in more detail in FIGS. 3 and 4. Referring again to FIG. 2, substrate 70 includes an upper surface 74 and a lower surface 76. Connecting lines 151A-155A of electrically conductive material are situated on upper surface 74 adjacent one edge of cavity 72. Connecting lines 151B-155B are situated on upper surface 74 adjacent an edge of cavity 72 opposite lines 151A-155A. These connecting lines achieve electrical connection to pads 51A-55A and 51B-55B of display 10 in the manner subsequently described.

The mounting structure includes a mounting panel 80 having upper and lower surfaces 82 and 84, respectively. Mounting panel 80 is comprised of electrically insulative material and includes at least one opening 86 having dimensions and shape similar to cavity 72. Substrate 80 has a number of openings 86 equal to the number of cavities 72 of substrate 70. Each opening 86 of mounting panel 80 is situated below and a substantially aligned with corresponding cavities of substrate 70. However, each of openings 86 are dimensioned somewhat smaller than the corresponding cavity 72 of substrate 70 such that when substrate 70 and mounting panel 80 are situated together in the manner of FIGS. 3 and 4, a lip 88 is formed in mounting panel 80. Referring again to FIG. 2, electrical connecting lines 161A-167A and 161B-167B are situated on upper surface 82 and run in a direction perpendicular to connecting lines 151A-155A. Lines 161A-167A and 161B-167B approach opening 86 from opposite sides of opening 86 and overlap lip 88 as shown in FIG. 2 and FIG. 3 which illustrates the assembled display mounting structure. A solder bead, electrically conductive epoxy or other electrically connective material is situated on each of the ends of these connective lines on upper surface 82 where such lines overlap lip 88 such that when display character element 10 is situated in cavity 72, the electrodes on lower surface 76 make electrical contact with respective connecting lines on upper surface 82. More specifically, when so situated, lines 161A-167A make electrical contact with electrodes 61A-67A, respectively. Lines 161B-167B make electrical contact with electrodes 61B-67B, respectively. (If solder is employed as the electrically connective material, as opposed to conductive epoxy, the mounting structure must be appropriately heated to assure high quality electrical connections.)

A lid-like interconnection element 90 of electrically insulative material having electrical connecting lines disposed thereon is employed to electrically connect the electrodes 51A-55A and 51B-55B to respective connecting lines 151A-155A and 151B-155B on upper substrate surface 74. Lid 90 includes a main body 92 which fits into cavity 72 as shown in FIGS. 2, 3 and 4. Interconnecting element 90 includes a rim 94 which is sufficiently larger than main body 92 so as to overlap upper substrate surface 74 when element 90 is inserted into cavity 72. Element 90 is thus supported upon insertion into cavity 72. Element 90 includes an aperture 96 situated extending therethrough and being sufficiently large to enable viewing of the display 10 therebelow by an observer above display 10. A transparent member 99 is situated in cavity 72 to protect and allow viewing of PLZT display 10 therebelow when display 10 is operated in the transmissive mode. Other elements such as polarizing elements, color filters, gratings or rulings may be substituted for member 99 when desired. Interconnecting element 90 further includes an upper surface 97 and a lower surface 98 as seen in FIGS. 2, 3 and 4. To establish an electrical connection between electrode 51A and connecting line 151A, an interconnection line 251A is situated on element 90 running from the portion of rim 94 adjacent connecting line 151A to the portion of bottom surface 98 adjacent electrode 51A as seen in FIG. 2 and more clearly in FIG. 4. Electrically conductive epoxy or other suitable electrically conductive connecting material is situated between connecting line 151A and interconnecting line 251A to connect each to the other. Likewise, interconnecting element 251A is electrically coupled to electrode 51A by a layer 351A of electrically conductive material such as conductive epoxy (represented by ball 351A in FIG. 4) situated therebetween. In a similar manner, electrode 51B is electrically coupled to connecting line 151B by interconnecting line 251B. Element 90 further includes interconnecting elements 352A-355A and interconnecting elements 352B-355B as shown in FIGS. 2 and 3 to respctively connect the remaining electrodes 52A-55A and 52B-55B to the remaining upper surface connecting lines 152A-155A and 152B-155B. In an alternative embodiment of the present invention, all the electrodes, interconnecting elements, interconnecting lines and electrical connecting lines designated with the suffix B may be eliminated without substantially affecting the electrical connecting qualities of the mounting structure.

The foregoing describes a mounting structure capable of accomodating a plurality of discrete electro-optic character elements. The mounting structure of the invention eliminates the waste of PLZT material between character elements.

While only certain preferred features of the invention have been shown by way of illustration, many modifications and changes will occur to those skilled in the art. It is, therefore, to be understood that the present claims are intended to cover all such modifications and changes as fall within the true spirit of the invention.

I claim:

1. An optical display mounting structure comprising:
   an electrically insulative first substrate having upper and lower opposed surfaces and at least one cavity situated therein, said cavity being shaped to receive a display character element therein;
   at least one display character element having upper and lower opposed surfaces and electrodes situated on said upper and lower opposed surfaces thereof, said element being situated in said cavity;
   an electrically insulative second substrate having upper and lower surfaces and at least one opening, the upper surface of said second substrate facing the lower surface of said first substrate, said opening of said second substrate being substantially aligned with a respective cavity of said first substrate and forming a lip therewith;
   first electrode elements situated on the upper surface of said first substrate;
   interconnection means for electrically coupling the electrodes on the upper surface of said character element to said first electrode elements, and
   second electrode elements situated on the upper surface of said second substrate, said second electrode elements extending onto said lip so as to contact and electrically couple to the electrodes on the lower surface of said character elements.

2. The optical display mounting structure of claim 1 wherein said interconnection means includes an aperture through which said character element may be viewed.

3. The optical display mounting structure of claim 2 wherein a transparent member is mounted in said aperture.

* * * * *